US008035929B2

(12) United States Patent
Kawakita et al.

(10) Patent No.: US 8,035,929 B2
(45) Date of Patent: Oct. 11, 2011

(54) MAGNETIC HEAD ASSEMBLY AND MAGNETIC TAPE DRIVING APPARATUS

(75) Inventors: Toshio Kawakita, Osaka (JP); Shinji Kawakami, Osaka (JP); Sadamu Kuse, Osaka (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 568 days.

(21) Appl. No.: 12/191,925

(22) Filed: Aug. 14, 2008

(65) Prior Publication Data
US 2009/0052093 A1 Feb. 26, 2009

(30) Foreign Application Priority Data
Aug. 22, 2007 (JP) .................................. 2007-216315

(51) Int. Cl.
*G11B 5/265* (2006.01)
(52) U.S. Cl. ....................................................... 360/315
(58) Field of Classification Search .................... 360/315
See application file for complete search history.

(56) References Cited

U.S. PATENT DOCUMENTS

| | | | |
|---|---|---|---|
| 4,842,945 A | 6/1989 | Ito et al. | |
| 6,122,147 A | 9/2000 | Fahimi et al. | |
| 6,470,565 B1 | 10/2002 | Sasaki | |
| 6,995,948 B2 | 2/2006 | Nakayama | |
| 7,414,811 B2 * | 8/2008 | Biskeborn | 360/129 |
| 7,548,397 B2 * | 6/2009 | Biskeborn et al. | 360/121 |
| 7,684,148 B2 * | 3/2010 | Biskeborn | 360/121 |
| 7,724,474 B2 * | 5/2010 | Maejima et al. | 360/237.1 |
| 2006/0177702 A1 * | 8/2006 | Ajan | 428/828.1 |
| 2006/0262439 A1 | 11/2006 | Wu | |
| 2007/0109681 A1 * | 5/2007 | Biskeborn et al. | 360/121 |
| 2008/0259494 A1 * | 10/2008 | Biskeborn | 360/122 |
| 2008/0291566 A1 * | 11/2008 | Biskeborn et al. | 360/75 |

FOREIGN PATENT DOCUMENTS

| | | |
|---|---|---|
| JP | 63-140083 A | 6/1988 |
| JP | 7-230615 A | 8/1995 |
| JP | 2000-207800 A | 7/2000 |

(Continued)

OTHER PUBLICATIONS

University of California, San Diego, Center for Magnetic Recording Research (CMRR) Report, pp. 2-12, No. 24, Summer 2005.

(Continued)

*Primary Examiner* — Mark Blouin
(74) *Attorney, Agent, or Firm* — Birch, Stewart, Kolasch and Birch, LLP (57) ABSTRACT

A magnetic head assembly of the present invention includes a head rail having a plurality of head element portions each including a MR element and sliding portions that come into contact with a magnetic tape, and a protective film on a magnetic tape sliding surface of the head element portions and the sliding portions, wherein the protective film is formed in a portion other than the vicinity of both ends of the head rail in a traveling direction, and an outermost surface of the protective film, on which a magnetic tape is capable of sliding, is formed flat. Thus, a magnetic head assembly used in a magnetic tape apparatus can be provided, in which an output does not decrease due to the abrasion deformation of the head element portions and the increase in spacing by the adhesion of stain.

6 Claims, 7 Drawing Sheets

FOREIGN PATENT DOCUMENTS

| | | |
|---|---|---|
| JP | 2001-143215 | 5/2001 |
| JP | 2001-236619 A | 8/2001 |
| JP | 2003-151107 | 5/2003 |
| JP | 2003-275889 A | 9/2003 |
| JP | 2004-47090 A | 2/2004 |
| JP | 2006-323992 A | 11/2006 |

OTHER PUBLICATIONS

New Diamond Forum, pp. 14-17, vol. 4, No. 4, Oct. 25, 1988, Hideo et al.

Japanese Office Action dated May 26, 2011 corresponding to Japanese Application No. 2007-216315.

* cited by examiner

MAGNETIC HEAD ASSEMBLY AND MAGNETIC TAPE DRIVING APPARATUS

BACKGROUND OF THE INVENTION

1. Field of the Invention

The present invention relates to a magnetic head assembly used in a linear recording magnetic tape apparatus. More specifically, the present invention relates to a magnetic head assembly using a magnetic resistance element of a magnetic resistance (MR) type, a giant magnetic resistance (GMR) type, a tunneling junction magnetic resistance (TMR) type, or the like. The present invention also relates to a magnetic tape apparatus using such a magnetic head assembly.

2. Description of Related Art

In the field of a magnetic tape for data backup, a magnetic tape having a recording capacity of 800 GB or more per volume has been commercialized along with the increase in capacity of a hard disk targeted for backup. Furthermore, a large-capacity future backup tape having a capacity exceeding 4 TB has been proposed, and the increase in capacity thereof is indispensable.

A recording/reproducing magnetic head assembly used in such a large-capacity magnetic tape apparatus includes an induction head element (recording element) capable of recording information on a magnetic tape and an MR induction complex head element (reproducing element) capable of reading information recorded on the magnetic tape. The induction head element is configured by forming a magnetic pole, a coil, a MR element layer, and the like on a base, using a thin film generation method. The MR induction complex head element can be formed of a MR head element. The magnetic head assembly is configured by placing a plurality of (for example, 8 to 16) induction head elements and MR induction complex head elements on a head rail that has an elongated shape in a direction orthogonal to a magnetic tape traveling direction. Generally, the magnetic head assembly has a configuration in which two head rails are arranged in parallel in the magnetic tape traveling direction. The number of head rails may be one or at least three.

In the magnetic head assembly with such a configuration, during traveling of a magnetic tape in a forward direction, a signal is recorded on the magnetic tape with magnetic heads mounted on a leading rail, and a signal recorded on the magnetic tape is reproduced with magnetic heads mounted on a trailing rail. Such an operation is performed for simultaneous recording and reproduction in a plurality of channels (8 to 16). Furthermore, during traveling in a reverse direction, an operation opposite to the above operation during traveling in a forward direction is performed. Herein, a magnetic head assembly, in which a rail without head chips is present, may be used.

Furthermore, in these magnetic head assemblies, a servo head (MR head chips for reproducing a servo signal) is provided at each end of a head rail with a plurality of recording elements and reproducing elements mounted thereon. The servo head can read a servo signal recorded on a magnetic tape. The magnetic tape apparatus controls the position of the magnetic head assembly in a tape width direction so that magnetic heads can trace a predetermined track, based on the servo signal read by the servo head. There also is a magnetic tape apparatus that reads a servo pattern, which has a plurality of concave portions for detecting an optical position and is formed on a backcoat side of a magnetic tape, with an optical sensor, thereby performing tracking servo.

Figure 4A:
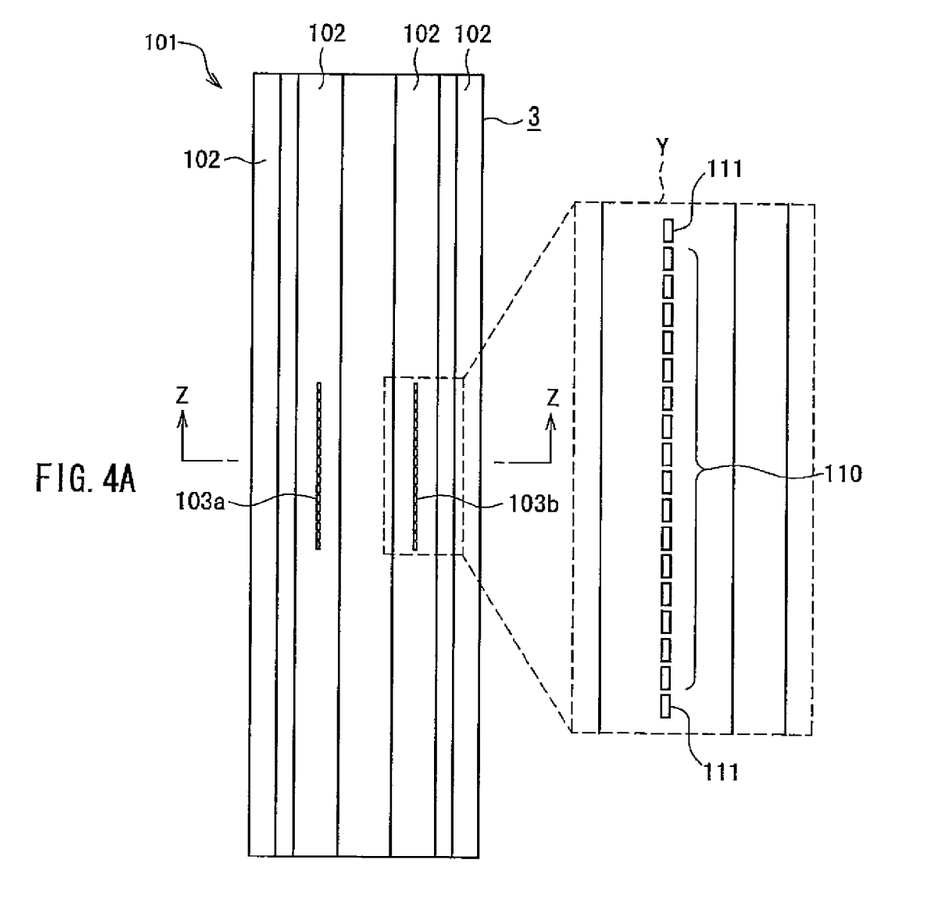
FIG. 4A is a plan view illustrating the configuration of the magnetic head assembly.
Figure 4B:
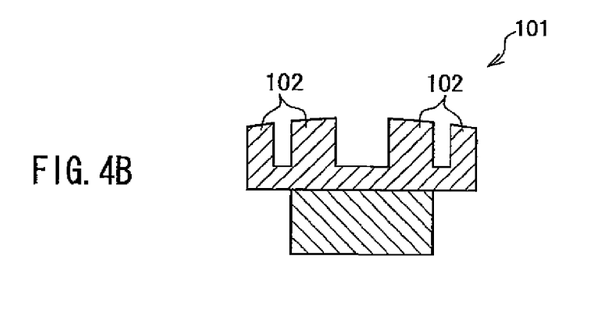
FIG. 4B is a cross-sectional view illustrating the configuration of the magnetic head assembly.

FIG. 4A shows an example of a magnetic head assembly composed of four rails. FIG. 4B shows a cross-section taken along a Z-Z line in FIG. 4A. As shown in FIGS. 4A and 4B, in a magnetic head assembly 101, a pair of head chip groups 103a and 103b are placed in a part of four rails 102 on which a magnetic tape slides. As shown in a Y-portion (enlarged view of the head chip group) in FIG. 4A, one head chip group is composed of a data head 110 including 16 head chips capable of recording or reproducing a data signal with respect to a magnetic tape, and a servo head 111 placed at each end of the data head 110, capable of reading a servo signal recorded on the magnetic tape.

Figure 5A:
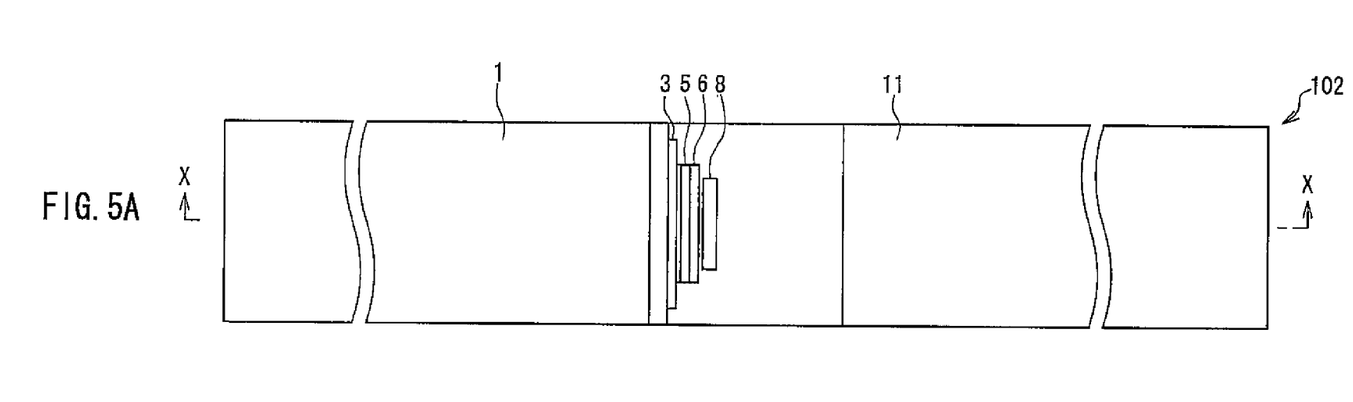
FIG. 5A is a plan view of the vicinity of a head chip in a conventional magnetic head assembly.
Figure 5B:
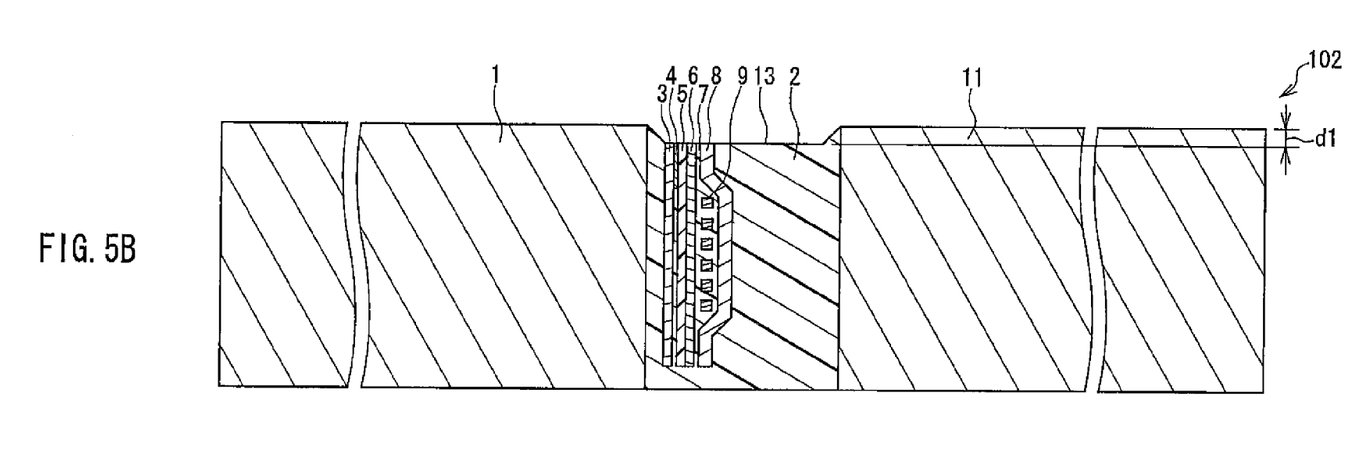
FIG. 5B is a cross-sectional view taken along an X-X line in FIG. 5A.

FIGS. 5A and 5B show a configuration of one magnetic head (a part of the data head 110) in the head chip group shown in FIG. 4A. FIG. 5A is a plan view of the magnetic head. FIG. 5B is a cross-sectional view taken along an X-X line in FIG. 5A. The magnetic head includes a base 1, an insulating layer 2, a magnetic shield layer 3, a MR element 4, a magnetic shield layer 5, a magnetic pole layer 6, a gap portion 7, a magnetic pole layer 8, a conductive coil 9, and a base 11. A head element portion includes the magnetic shield layer 3, the MR element 4, the magnetic shield layer 5, the magnetic pole layer 6, the gap portion 7, the magnetic pole layer 8, and the conductive coil 9.

In FIG. 5B, a dimension d1 corresponds to an initial pole tip recession (PTR). Furthermore, the dimension d1 is a depth of a concave portion 13 (abrasion level difference) caused by the difference in abrasion characteristics between the bases (AlTiC) 1 and 11, and the insulating layer (alumina glass) 2 and the head element portion (various kinds of materials) in a final polishing step in the course of production of the magnetic head assembly.

In a conventional linear magnetic head assembly, as shown in FIG. 5B, the surface of the head rail 102 including the surfaces of the bases (sliding portions) 1, 11 and the head element portion, opposed to the magnetic tape, is not provided with a protective film or the like, and the magnetic tape slides directly on the surface of the head rail 102. Document 1 (JP 7-230615 A) discloses a configuration in which a protective film such as a silicon oxide film or a carbon film is formed by sputtering only in a level difference caused by a treatment, generated in the head element portion in a thin film magnetic head for a hard disk.

In a conventional thin film magnetic head, stain (brown stain) adheres to the sliding surface between the head element portion and the magnetic tape, particularly, under a condition that recording and reproduction are performed repeatedly with respect to the same magnetic tape in a low humidity environment (20° C., 10% RH), which increases spacing. When the spacing increases, there arises a problem in that a reproduction output decreases, and an error rate increases. The stain is caused when a surface layer component of a magnetic layer of a magnetic tape peels off during traveling of the magnetic tape and adheres to the surface of the head element portion. It is conceivable that the stain adheres to the surface of the head element portion due to the heat generation caused by a current applied to the magnetic head during recording and reproduction, and the thermoelectric chemical reaction in which a potential difference occurs between the base (AlTiC) and the head chip due to the friction during traveling of the magnetic tape. Regarding the relationship between the potential difference between the base and the head chip, and the stain, research as described in Document 2 (Center for Magnetic Recording Research (CMRR) Report, page 11, number 24, Summer 2005, University of California, San Diego) has been conducted.

In the case of the magnetic head for a magnetic disk as disclosed by Document 1, a minute magnetic head slider (magnetic head assembly) placed at the end of a gimbal opposed to a magnetic disk is kept in contact with the magnetic disk during the suspension of the rotation of the magnetic disk When the magnetic disk is rotated at a high speed, the magnetic head slider floats from the magnetic disk due to the air bearing effect caused by the relative movement between the head rail and the magnetic disk according to a contact start stop (CSS) system. In contrast, the magnetic head for a magnetic tape comes into contact with a magnetic tape even during traveling of the magnetic tape. Furthermore, the stiffness of a medium in the magnetic disk is very high, so that the difference in hardness between the magnetic disk and the magnetic head is not so large. The magnetic tape is very thin and has low stiffness, so that the difference in hardness between the magnetic tape and the magnetic head is large.

As described above, in the case of the magnetic head for a magnetic tape, the PTR during traveling of the magnetic tape proceeds due to the aggressive abrasion. On the other hand, in the case of the magnetic head for a magnetic disk, a magnetic head assembly portion including a head element portion floats from the magnetic disk, so that the magnetic head assembly portion is almost in no-contact with the magnetic disk, and hence, polishing powder is not generated, and aggressive abrasion does not occur. However, according to the configuration in which a magnetic tape is allowed to travel while the magnetic tape is in contact with the magnetic head as in the magnetic head for a magnetic tape, the difference in hardness between the material for the magnetic tape and the material for the magnetic head is large, so that aggressive abrasion occurs to allow the PTR to proceed. The "aggressive abrasion" refers to the abrasion caused by the contact among three bodies. For example, the aggressive abrasion refers to the abrasion caused by the contact among three bodies: a magnetic head, a magnetic tape, and polishing powder (dropped substances from the magnetic tape, the magnetic head, or the like).

Furthermore, Document 1 discloses that a protective film is provided only in a concave portion of a head element portion of a magnetic head for a magnetic disk. According to this procedure, a protective film is not formed in a base portion, so that potential difference is likely to be caused between the base portion and the head element portion. Consequently, the generation of the above-mentioned stain cannot be prevented sufficiently.

SUMMARY OF THE INVENTION

Therefore, with the foregoing in mind, it is an object of the present invention to provide a magnetic head assembly used for a magnetic tape apparatus, in which there is no decrease in an output due to the increase in spacing caused by the abrasion deformation of a head element portion and the adhesion of stain. It is another object of the present invention to provide a magnetic tape apparatus capable of decreasing an error rate.

The inventors of the present invention earnestly studied a magnetic head assembly used in a magnetic tape apparatus, and consequently, achieved the above objects by configuring the magnetic head assembly as follows, thereby leading to the present invention.

A magnetic head assembly of the present invention includes: a head rail having a plurality of head element portions each including a MR element and sliding portions that come into contact with a magnetic tape; and a protective film formed on a magnetic tape sliding surface of the head element portions and the sliding portions, wherein the protective film is formed in a portion other than a vicinity of both ends of the head rail in a traveling direction of the magnetic tape, and an outermost surface of the protective film, on which the magnetic tape is capable of sliding, is formed flat.

In the magnetic head assembly of the present invention, the head element portions and the sliding portions of the magnetic head assembly are covered with the protective film, and the outermost surface of the protective film is formed flat without causing a level difference between the head element portions and the sliding portions. Therefore, the increase in spacing due to the abrasion of the head element portions and the adhesion of stain can be suppressed.

Furthermore, when the magnetic head assembly as described above is mounted on the magnetic tape apparatus, a magnetic tape apparatus with an error rate suppressed can be realized.

DETAILED DESCRIPTION OF THE INVENTION

A magnetic head assembly of the present invention includes: a head rail having a plurality of head element portions each including a MR element and sliding portions that come into contact with a magnetic tape; and a protective film formed on a magnetic tape sliding surface of the head element portions and the sliding portions, wherein the protective film is formed in a portion other than a vicinity of both ends of the head rail in a traveling direction of the magnetic tape, and an outermost surface of the protective film, on which the magnetic tape is capable of sliding, is formed flat. According to such a configuration, the head element portions and the sliding portions of the magnetic head assembly are covered with the protective film, and the outermost surface of the protective film is formed flat without causing a level difference between the head element portions and the sliding portions. Therefore, the increase in spacing due to the abrasion of the head element portions and the adhesion of stain can be suppressed.

The magnetic head assembly of the present invention can have various embodiments as described below, based on the above configuration.

In the magnetic head assembly of the present invention, an outermost layer of the protective film can be made of a diamond-like carbon film.

Furthermore, a thickness of the protective film can be 2 nm to 20 nm at a position where the protective film is opposed to the MR element of the head element portion. Such a configuration is preferred because an initial output does not decrease.

Furthermore, it is preferred that the protective film further includes a silicon-containing protective film between a portion that is in contact with the head element portion and the sliding portion, and the diamond-like carbon film. According to such a configuration, the surface of the head element portion can be insulated electrically. Furthermore, the peeling resistance of the diamond-like carbon film can be enhanced. The corrosion resistance of the surface of the head element portion also can be enhanced.

Furthermore, a relationship: 5 µm≦L≦W/4 can be satisfied, where L represents a width in the traveling direction of both ends in the traveling direction of the head rail, in which the protective film is not formed. According to such a configuration, both ends of the head rail in the width direction can be abraded into a preferred shape, whereby the damage to the magnetic tape involved in traveling can be reduced. The increase in an error rate also can be suppressed.

Embodiment 1

[1. Configuration of a Magnetic Head Assembly]

Figure 1A:
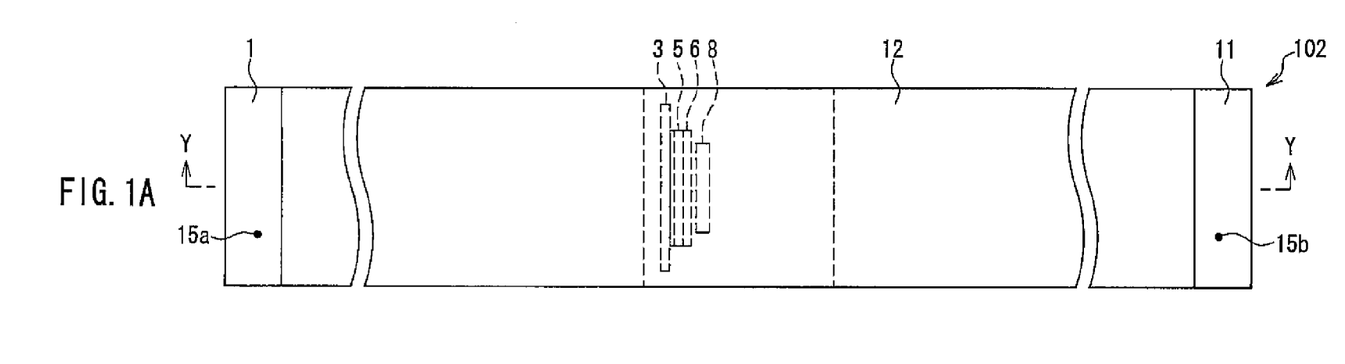
FIG. 1A is a plan view of the vicinity of a head chip in a magnetic head assembly of an embodiment according to the present invention.
Figure 1B:
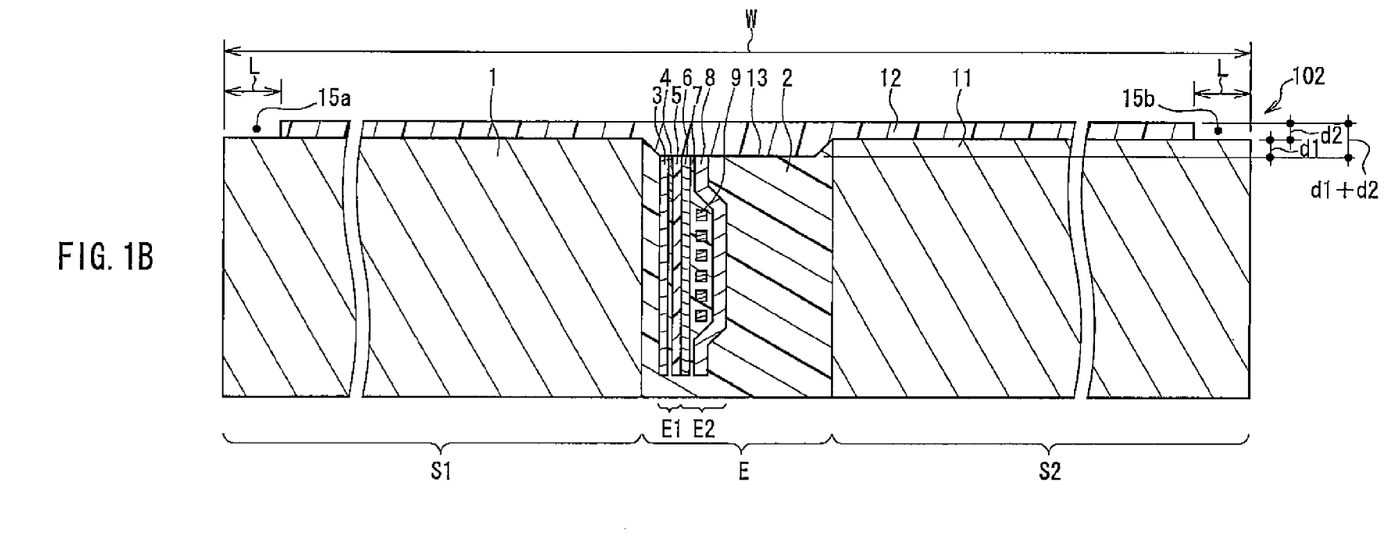
FIG. 1B is a cross-sectional view taken along a Y1-Y1 line in FIG. 1A.

FIG. 1A is a plan view of a part of a magnetic head assembly of the present embodiment. FIG. 1B is a cross-sectional view taken along a line Y1-Y1 in FIG. 1A. A magnetic head shown in FIGS. 1 and 2 corresponds to a magnetic head (data head) including one head chip in the above-mentioned head chip group shown in FIG. 4A.

A head element portion E is embedded in an insulating layer 2 interposed between a pair of bases 1 and 11 that are sliding portions S1 and S2. The bases 1 and 11 generally are made of hard AlTiC ($Al_2O_3TiC$). The insulating layer 2 generally is made of alumina glass ($Al_2O_3$). Furthermore, a head element portion E is composed of an electromagnetic transducer portion E1 for reproduction and an electromagnetic transducer portion E2 for recording. The electromagnetic transducer portion E1 is composed of a pair of magnetic shield layers 3 and 5, and a MR element 4 placed at a position interposed between the magnetic shield layers 3 and 5. The electromagnetic transducer portion E2 is composed of magnetic pole layers 6 and 8 opposed to each other with a gap 7 placed therebetween, and a conductive coil 9. In the cross-sectional view of FIG. 1B, the description of an insulating layer between the magnetic shield layers 3 and 5, and the MR element 4, and electrodes formed at both ends of the M element 4 is omitted. Furthermore, as the MR element 4, a GMR element is used preferably As the material for the magnetic shield layers 3 and 5, sendust (AlFeSi-based amorphous alloy) is used preferably. As the material for the magnetic pole layers 6 and 8, permalloy (Ne—Fe), sendust, or the like is used preferably.

The head element portion E and the sliding portions S1, S2 preferably have flat surfaces without any level difference. However, since alumina glass that is a main component constituting the head element portion E is softer than AlTiC constituting the sliding portions S1, S2, when the head element portion E and the sliding portions S1, S2 are formed by polishing the surfaces thereof, the head element portion E generally is formed with a dent (concave portion 13) of about 5 µm. The concave portion 13 is referred to as a PTR, and the depth thereof is a dimension d1.

The configurations and shapes of the head element portion E, and the sliding portions S1, S2 of the magnetic head assembly of the present embodiment are the same as those of the conventional head assembly. In the conventional magnetic head assembly, the break-in traveling of a magnetic tape is performed before an actual use, whereby edges at both ends (sliding portions) of a head rail 102 are rounded by the friction between the magnetic tape and the head rail 102, so that the PTR increases to about 15 to 20 nm. Furthermore, due to the actual use, the PTR increases up to about 40 nm, and the spacing from the magnetic tape increases. Consequently the output decreases, and an error increases, with the result that an actual life expires.

In the magnetic head assembly of the present invention, the dimension d1 is set to be 18 nm or less, more preferably 10 nm or less, and most preferably 5 nm or less for the following reason: when the dimension d1 exceeds 18 nm, the spacing from the magnetic tape increases, resulting in a decrease in an output.

Furthermore, in the magnetic head assembly of the present invention, a protective film 12 is formed on the head element portion E and the sliding portions S1, S2. It is preferred that a thickness d2 of the protective film 12 is in a range of 2 to 15 nm on the surfaces of the sliding portions S1, S2 for the following reason: when the thickness 12 is less than 2 nm, a protection function is not exhibited sufficiently and the life of a head is not prolonged sufficiently, and when the thickness d2 exceeds 15 nm, the spacing from the magnetic tape increases, resulting in a decrease in an output. Furthermore, the total thickness (d1+d2) of the protective film 12 is preferably 20 nm or less, more preferably 15 nm or less, and most preferably 10 nm or less at the position of the MR element 4 of the head element portion E. The reason why this range is preferred is that the spacing increases, resulting in a decrease in an output, when the total thickness (d1+d2) exceeds 20 nm. Furthermore, the outermost surface of the protective film 12 is preferably flat without any level difference between the head element portion E and the sliding portions S1, S2. By making the outermost surface of the protective film 12 flat the contact between the head chip and the magnetic tape becomes stable, so that the output becomes stable. The traveling of the magnetic tape also becomes stable.

Furthermore, at ends 15a and 15b of the sliding portions S1 and S2 (head rail 102) in the traveling direction, there are portions where the protective film 12 is not formed and the bases 1 and 11 are exposed. In the case of setting the width of the head rail 102 to be W, and each width of the ends 15a and 15b in which the protective film 12 is not provided, to be L, it is preferred that a relationship: 5 µm≦L≦W/4 is satisfied. The reason why it is preferred to set the value of the width L in this range is that both ends of the head rail 102 in the width direction are prevented from being abraded into a preferred shape (being rounded appropriately) when the width L is less than 5 µm. In the case where both ends of the head rail 102 in the width direction are not abraded, the edges of the head rail 102 remain angled. Therefore, when a magnetic tape is allowed to slide on the magnetic head, the magnetic tape is damaged seriously, which increases an error rate.

Furthermore, as the material for the protective film 12, for example, diamond-like carbon (DLC) is used. Furthermore, it is preferred that the protective film 12 has a two-layered structure formed in the sliding portions S1, S2 via a silicon-containing protective film 14 (described later with reference to FIG. 2A and the like). The reason for this is that the corrosion resistance of the MR element 4 can be enhanced, and the contact between the sliding portions S1, S2 and the protective film 12 of DLC can be enhanced.

[2. Method for Producing a Magnetic Head Assembly]

A specific method for producing the protective film 12 will be described with reference to FIGS. 2A to 2E.

Figure 2A:
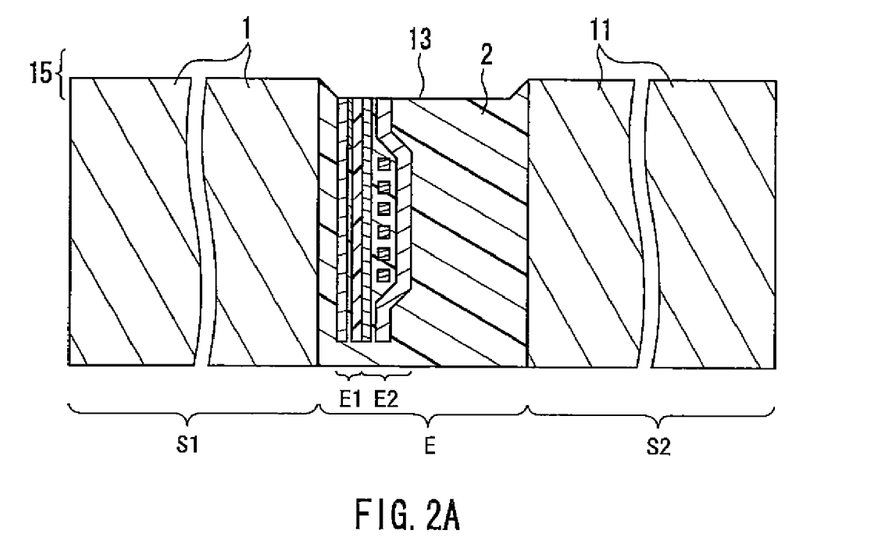
FIG. 2A is a cross-sectional view illustrating the step of producing the magnetic head assembly of the embodiment according to the present invention.

FIG. 2A is a cross-sectional view of one magnetic head in the head rail 102 produced by the conventional production method. The head rail 102 including the head element portion E is subjected to a finishing treatment on a rotating tin surface plate, for example, using an alkaline polishing slurry in which an alkaline lubricant is added to diamond as a polishing agent after the final polishing treatment. Furthermore, an edge treatment or the like of both ends of the sliding surfaces of the bases 1 and 11 is performed with a polishing tape. Due to these treatments, a concave portion 13 having a depth of d1 shown in FIG. 1, which is an abrasion level difference of 5 to 8 nm, is formed between the insulating layer (alumina glass) 2 and the bases (ATiC) 1 and 11. In a magnetic head assembly mounted on an ordinary linear tape drive, the dimension d1 is 5 to 15 nm, the head rail width W in the tape traveling direction is 200 to 700 μm, and the width of the head element portion E is 30 to 40 μm.

Figure 2B:
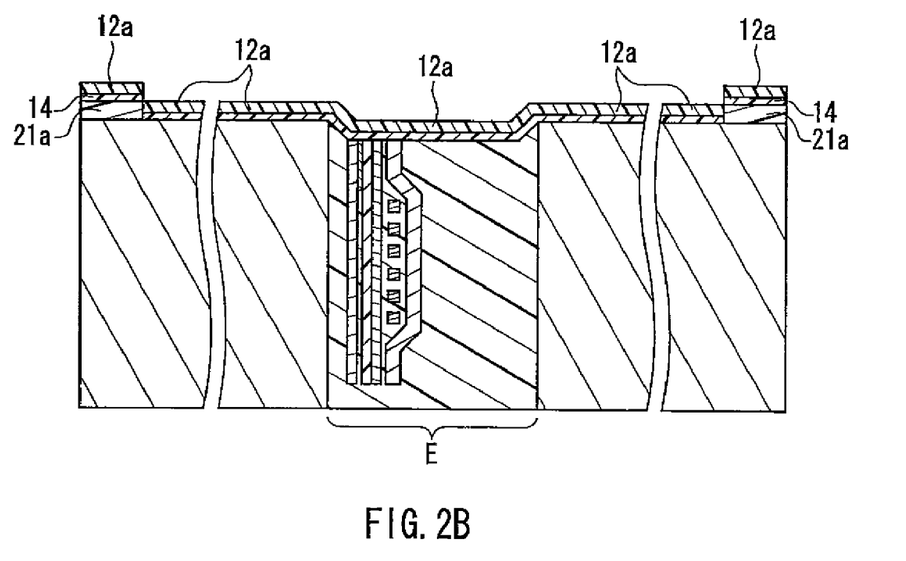
FIG. 2B is a cross-sectional view illustrating the step of producing the magnetic head assembly of the embodiment according to the present invention.

Next, as shown in FIG. 2B, a mask 21a (photoresist film) is formed at each end of a sliding portion 15 in the head rail width direction with respect to the magnetic head assembly shown in FIG. 2A, and thereafter, the silicon-containing protective film 14 is formed on the mask 21a. The silicon-containing protective film 14 is formed to a thickness of, for example, about 1 nm. Here, the silicon-containing protective film 14 is, for example, $SiC_XH_YO_ZN_WF_TB_UP_V$ (herein, X=0.5 to 26, Y=0.5 to 13, Z=0 to 6, W=0 to 6, T=0 to 6, U=0 to 1, and V=0 to 1) as disclosed by JP 2004-47090 A. Then, a DLC film 12a with a thickness of 5 nm is formed further. Herein, the DLC film 12a may be referred to as a "diamond-like carbon film", an "I-carbon films", or the like, and is described in documents such as JP 63-140083 A and New Diamond Forum, Vol. 4, No. 4 (issued on Oct. 25, 1988). Furthermore, a method for forming a DLC film is disclosed by, for example, JP 2004-47090 A.

Figure 2C:
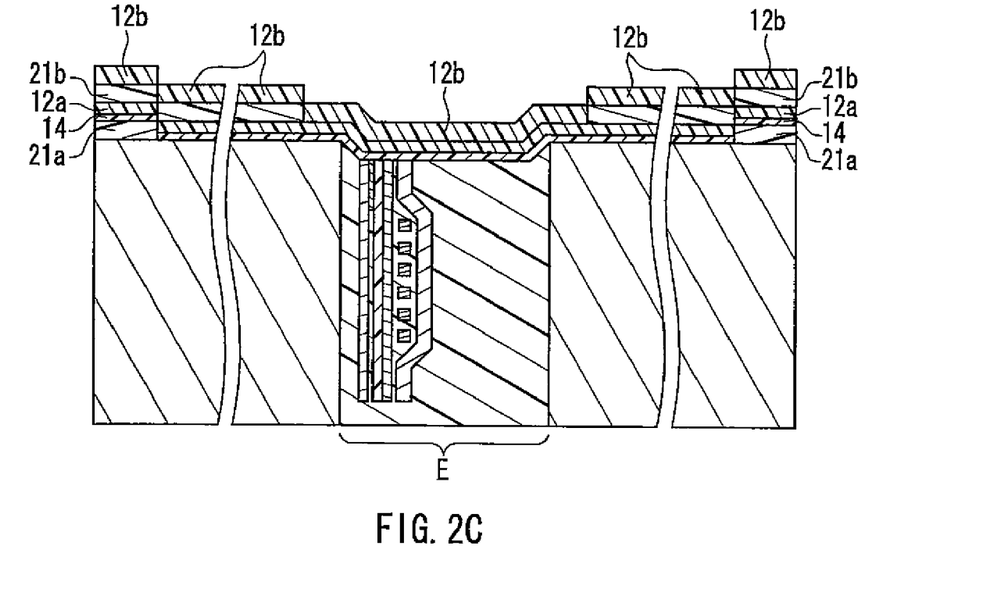
FIG. 2C is a cross-sectional view illustrating the step of producing the magnetic head assembly of the embodiment according to the present invention.

Next, as shown in FIG. 2C, a mask 21b is formed in a portion other than the vicinity of the head element portion E, and thereafter, a DLC film 12b with a thickness of 11 nm is formed on the mask 21b.

Figure 2D:
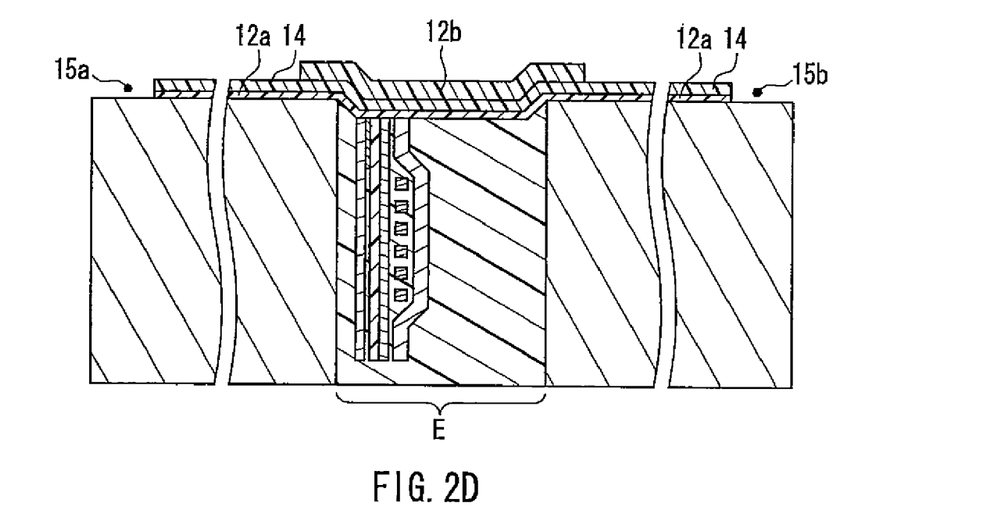
FIG. 2D is a cross-sectional view illustrating the step of producing the magnetic head assembly of the embodiment according to the present invention.

Next, as shown in FIG. 2D, the masks 21a and 21b are removed. At this time, the DLC films 12a and 12b remain in the head element portion E and the vicinity thereof, so that the thickness thereof is non-uniform, compared with that in the periphery. Although it is difficult to treat the DLC films in this portion by mechanical polishing or the like, the DLC films can be removed selectively by a laser treatment. The laser treatment method of the DLC films is disclosed by, for example, JP 2003-275889 A.

Figure 2E:
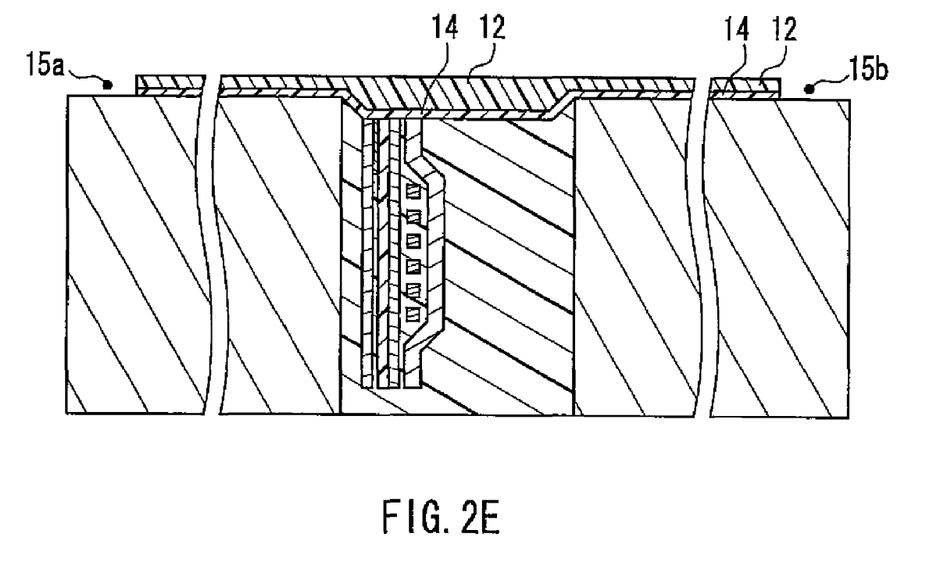
FIG. 2E is a cross-sectional view illustrating the step of producing the magnetic head assembly of the embodiment according to the present invention.

Thus, as shown in FIG. 2E, the protective film 12 can be formed in a portion other than ends 15a and 15b (L=15 μm) of the head rail 102 in the tape traveling direction.

Accordingly, the protective film 12 that is uniform and flat can be formed without causing a level difference between the head element portion E, the insulating layer 2, and the bases 1 and 11. Furthermore, the protective film 12 formed of the DLC films having a thickness of 10 nm on the head element portion E can be formed.

Next, the reason why the protective film 12 is not formed at the ends 15a and 15b of the head rail 102 will be described.

Figure 3A:
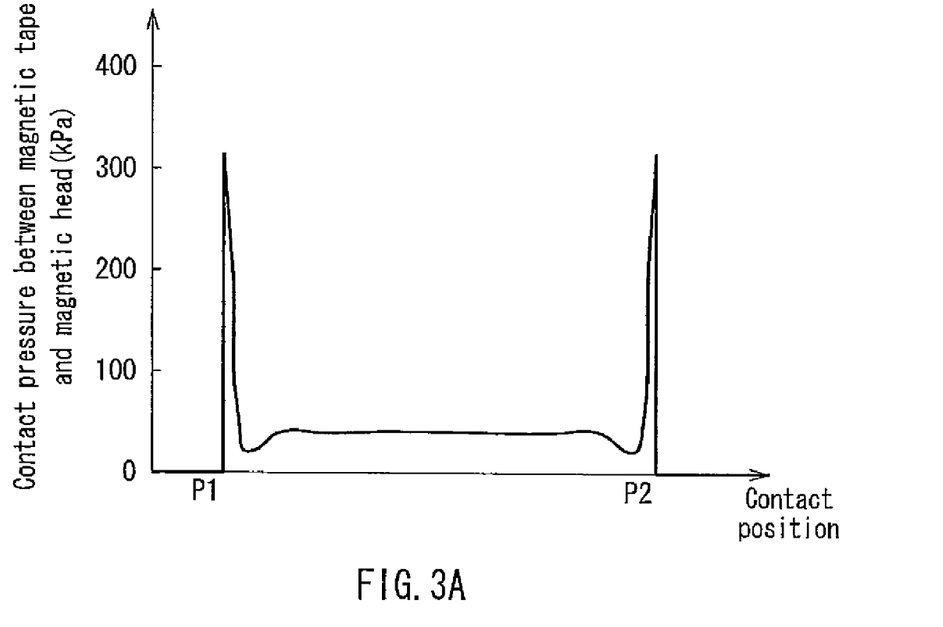
FIG. 3A is a characteristics diagram illustrating the relationship between the contact pressure between a magnetic tape and a magnetic head, and the contact position.
Figure 3B:
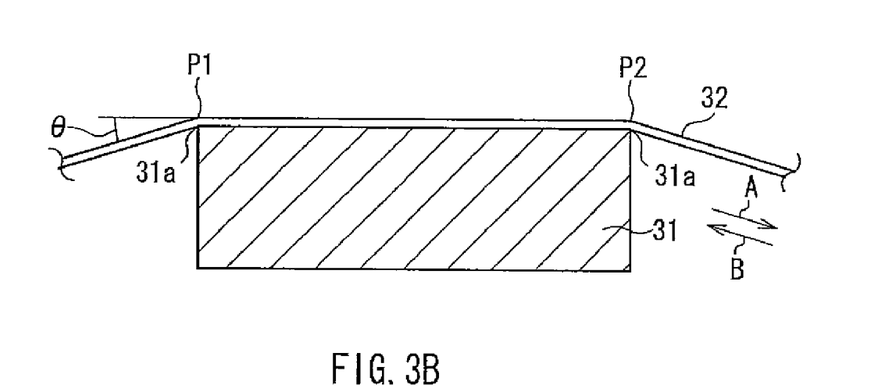
FIG. 3B is a schematic view illustrating the contact state between the magnetic head and the magnetic tape.

FIG. 3A is a graph showing a relationship between a contact pressure and a contact position in a magnetic tape/magnetic head. FIG. 3B is a diagram schematically showing the contact state between a magnetic head 31 and a magnetic tape 32.

An overlap angle θ between the magnetic tape 32 and the magnetic head 31 is 0.7° to 1.5°. When the magnetic tape 32 travels on the sliding surface of the magnetic head 31 in such a state, the magnetic tape 32 is in contact with edge portions 31a at both ends of the magnetic head 31 in the magnetic tape traveling direction (represented by an arrow A or B) at a predetermined contact pressure, so that air flowing into between the magnetic head 31 and the magnetic tape 32 is cut, and a negative pressure is generated therebetween. Thus, the stable contact state is kept between the magnetic tape 32 and the magnetic head 31.

As shown in FIG. 3A, the contact pressure distribution in the edge portions 31a (contact portions P1 and P2) at both ends of the magnetic head 31 is set by a tape tension and a winding angle θ, so that the contact pressure distribution is in a range of about 200 to 300 kPa. On the other hand, the contact pressure distribution in the remaining sliding portion (between the edge portions 31a at both ends of the magnetic head 31) is in a range of about 30 to 50 kPa.

The purpose of forming the protective film 12 in a portion other than the vicinity of both ends of the magnetic head is to prevent the protective film 12 from being abraded to generate abrasion powder in the edge portions 31a that are high-contact pressure portions, and the abrasion powder from entering between the magnetic head 31 and the magnetic tape 32 to cause aggressive abrasion in the magnetic head 31.

[3. Effects of an Embodiment, etc.]

According to the present embodiment, in a magnetic head assembly in which a PTR is formed, the protective film 12 composed of, for example, a DLC film is formed in the head element portion E and the sliding portions S1, S2", and the surface (magnetic tape sliding surface) of the protective Elm 12 is formed flat, whereby the increase in spacing caused by the abrasion of the head element portion E and the adhesion of stain can be alleviated. This can prevent the output in the magnetic head from decreasing. Furthermore, by mounting such a magnetic head assembly on a magnetic tape apparatus, an error rate of data to be reproduced from the magnetic tape can be decreased.

Furthermore, by forming the silicon-containing protective film 14 under the protective film 12, the electric insulation on the magnetic tape sliding surface of the magnetic head assembly can be realized, the peeling resistance of the protective film 12 can be enhanced, and the corrosion resistance of the magnetic tape sliding surface of the magnetic head assembly can be enhanced.

In the present embodiment, the protective film 12 may be formed of a material with a high hardness, instead of the DLC film. However, the DLC film is preferred due to the advantages of a low cost and the ease of forming a film. Examples of the material with a high hardness include titanium nitride, silicon nitride, and crystal carbon coating layer film with a high hardness.

Furthermore, in the present embodiment, although a flat head has been illustrated as an example, an R-shaped type head with a tape sliding surface curved may be used.

Hereinafter, although the present invention will be described more specifically by way of an example, the present invention is not limited thereto.

Example 1

<Method for Producing a Magnetic Tape>

First, a non-magnetic underlying coating with needle-shaped iron oxide non-magnetic powder and carbon black dispersed in a binder and a magnetic coating with grain-shaped iron nitride magnetic powder and alumina powder dispersed in a binder were produced by a conventional method. Then, the non-magnetic underlying coating was applied to one principal plane of a non-magnetic support made of a polyethylene naphthalate film with a thickness of 6 μm. The non-magnetic underlying coating was applied so as to have a thickness of 0.9 μm after a drying step and a calendaring step described later. Next, the magnetic coating was applied to the non-magnetic underlying layer by a wet-on-wet coating with an extrusion-type coater. The magnetic coating was applied so as to have a thickness of 0.08 μm after the drying step and the calendaring step described later. Next, a magnetic field alignment treatment (N—N opposed magnet (398 kA/m)+solenoid coil (398 kA/m)) was conducted. Then, the magnetic coating was dried with a drier and a far infrared radiation. Consequently, a magnetic sheet was produced.

Next, a backcoat coating with carbon black and grain-shaped iron oxide non-magnetic powder dispersed in a binder was produced by an ordinary method. Next, the produced backcoat coating was applied to a principal plane of the magnetic sheet on a side opposite to a magnetic layer. The backcoat coating was applied so as to have a thickness of 0.6 μm after the drying step and the calendaring step described later. Then, the backcoat coating was dried with a drier and a far infrared radiation. Thus, a magnetic sheet with a backcoat layer was produced.

Next, the magnetic sheet with a backcoat layer was subjected to mirror finishing (calendaring) under conditions of a temperature of 100° C. and a linear load of 196 kN/m with a 7-stage calendar formed of metal rolls, and the magnetic sheet was aged at 60° C. for 48 hours while being wound around a core, whereby a magnetic sheet for evaluation was produced. The magnetic sheet for evaluation was cut to a width of ½ inches to produce a magnetic tape for evaluation.

The surface roughness of the magnetic layer of the magnetic tape for evaluation was measured by a scanning white light interference method with a general-purpose three-dimensional surface profiler, NewView 5000 produced by Zygo Corporation. Specifically, the surface roughness was measured with a scan length set to be 5 μm and a measurement field of view set to be 350 μm×260 μm. As a result of the measurement, the value of an average surface roughness Ra in a center line of the magnetic tape was 2.4 nm.

The produced magnetic tape was cut to a full length of 680 nm satisfying a linear tape open (LTO) 3 condition, and incorporated into a cartridge in accordance with the LTO specification.

<Method for Producing a Head Assembly>

First, a magnetic head assembly with a configuration as shown in FIGS. 5A and 5B was produced. The magnetic head assembly was treated with the above-mentioned alkaline polishing slurry, and the dimension d1 was set to be 5 nm.

In two rails included in the magnetic head assembly, a resist film (mask 21a shown in FIG. 2B) with a masking width L of 15 μm was formed at both ends 15a and 15b (see FIG. 1) in the sliding portions S1 and S2, and the silicon-containing protective film 14 was formed to a thickness of 1 nm.

Next, the DLC film 12a with a thickness of 4 nm was formed on the silicon-containing protective film 14. The DLC film 12a was formed so as to have a thickness (d2) of 5 nm in the sliding portions S1 and S2.

Furthermore, the mask 21b was formed in a portion other than the vicinity (width of 40 μm) of the head element portion E, and thereafter, the DLC film 12b with a thickness of 11 nm was formed.

Next, the masks 21a and 21b were removed. Then, a protruding portion of the DLC film formed in the vicinity (width of 40 μm) of the head element portion E was removed selectively using a laser treatment, whereby the DLC film was made flat so as not to have a level difference between the head element portion E and the sliding portions S1 and S2.

Thus, a magnetic head assembly was produced, in which the thickness (d2) of the protective film 12 in the sliding portions S1 and S2 was 5 nm, and the thickness (d1+d2) of the protective film 12 at a position of the MR element 4 of the head element portion E was 10 nm Furthermore, as shown in Examples 2 to 6 in Table 1, a plurality of magnetic head assemblies were produced by varying the thickness (d2) of the protective film 12 and the masking width L. Furthermore, a magnetic head assembly without a protective film was produced (Comparative Example 1 in Table 1). Furthermore, a magnetic head assembly without forming making at both ends of the magnetic head was produced (Comparative Example 2 in Table 1).

TABLE 1

| | | | | Example | | | |
|---|---|---|---|---|---|---|---|
| | | | 1 | 2 | 3 | 4 |
| Head | d1 | (nm) | 5 | 5 | 5 | 5 |
| | d2 | (nm) | 5 | 5 | 5 | 5 |
| | d1 + d2 | (nm) | 10 | 10 | 10 | 10 |
| | L | (μm) | 15 | 5 | 50 | 100 |
| C(dB) Output | Traveling distance | Initial state | −1.3 | −1.3 | −1.3 | −1.3 |
| | | 2860 km | −1.8 | −2.3 | −1.8 | −1.8 |
| | | 5720 km | −2.3 | −2.8 | −2.3 | −2.3 |
| ΔC(dB) output change | Traveling distance | Initial state | 0.0 | 0.0 | 0.0 | 0.0 |
| | | 2860 km | −0.5 | −1.0 | −0.5 | −0.5 |
| | | 5720 km | −1.0 | −1.5 | −1.0 | −1.0 |

| | | | Example | | | Comparative Example |
|---|---|---|---|---|---|---|
| | | | 5 | 6 | 7 | 1 |
| Head | d1 | (nm) | 5 | 5 | 5 | 5 |
| | d2 | (nm) | 5 | 10 | 15 | 0 |
| | d1 + d2 | (nm) | 10 | 15 | 20 | 5 |
| | L | (μm) | 150 | 15 | 15 | 0 |
| C(dB) Output | Traveling distance | Initial state | −1.3 | −2.6 | −3.8 | 0.0 |
| | | 2860 km | −2.6 | −2.8 | −4.4 | −4.4 |
| | | 5720 km | −3.8 | −3.1 | −4.6 | −5.1 |
| ΔC(dB) output change | Traveling distance | Initial state | 0.0 | 0.0 | 0.0 | 0.0 |
| | | 2860 km | −1.3 | −0.3 | −0.5 | −4.4 |
| | | 5720 km | −2.6 | −0.5 | −0.8 | −5.1 |

TABLE 1-continued

| | | | Comparative Example 2 |
|---|---|---|---|
| Head | d1 | (nm) | 5 |
| | d2 | (nm) | 5 |
| | d1 + d2 | (nm) | 10 |
| | L | (μm) | 0 |
| C(dB) Output | Traveling distance | Initial state | X |
| | | 2860 km | — |
| | | 5720 km | — |
| ΔC(dB) output change | Traveling distance | Initial state | X |
| | | 2860 km | — |
| | | 5720 km | — |

X = tape damage

<Durability Test (Green Tape Test)>

Each magnetic head assembly shown in Table 1 was mounted and assembled on an LTO3 drive and adjusted. Then, a durability test was conducted using the LTO3 drive in an environment of 25° C. and 50% RH, and an initial reproduction output (average value of each reproduction channel head output) of 2T (recording wavelength: 0.38 μm), a reproduction output after traveling of 50 volumes (traveling distance: 2860 km), a reproduction output after traveling of 100 volumes (traveling distance: 5720 km), and a change in a reproduction output were checked. In the durability test (green tape test), the step of allowing a magnetic tape with a tape length per volume of 650 m to reciprocate 44 times is conducted successively with respect to 100 volumes of magnetic tapes.

Table 1 shows the results of the durability test. Herein, the values of the reproduction output and the reproduction output change shown in Table 1 are represented by relative values based on the initial output of the magnetic head assembly of Comparative Example 1.

In the magnetic head assembly of Comparative Example 1, the decrease in an output of −6.4 dB was recognized after traveling of 100 volumes. However, in the magnetic head assemblies of Examples 1 to 7, the decrease in an output after traveling of 100 volumes was small, i.e., −2.3 to −4.6 dB. Thus, it is understood that the output characteristics of the present invention (examples) are more excellent compared with the output characteristics of the conventional example (comparative examples).

Furthermore, in the case of the magnetic head assembly in Comparative Example 2, it is understood that there is a problem that a magnetic tape is damaged in both ends 15a and 15b of the magnetic head.

The present invention is useful for a magnetic head assembly capable of recording information onto a magnetic tape or reproducing information recorded on the magnetic tape. The present invention also is useful for a magnetic tape apparatus using such a magnetic head assembly.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magnetic head assembly, comprising:
   a head rail having a plurality of head element portions each including a MR element and sliding portions that come into contact with a magnetic tape; and
   a protective film formed on a magnetic tape shading surface of the head element portions and the sliding portions,
   wherein the protective film is formed in a portion other than a vicinity of both ends of the head rail in a traveling direction of the magnetic tape, and
   an outermost surface of the protective film, on which the magnetic tape is capable of sliding, is formed flat.

2. The magnetic head assembly according to claim 1, wherein an outermost layer of the protective film is made of a diamond-like carbon film.

3. The magnetic head assembly according to claim 1, wherein a thickness of the protective film is 2 nm to 20 nm at a position where the protective film is opposed to the MR element of the head element portion.

4. The magnetic head assembly according to claim 2, wherein the protective film further includes a silicon-containing protective film between a portion that is in contact with the head element portion and the sliding portion, and the diamond-like carbon film.

5. The magnetic head assembly according to claim 1, wherein a relationship: 5 μm≦L≦W/4 is satisfied, where L represents a width in the traveling direction of both ends in the traveling direction of the head rail, in which the protective film is not formed.

6. A magnetic tape apparatus comprising a magnetic head assembly,
   the magnetic head assembly including: a head rail having a plurality of head element portions each including a MR element and sliding portions that come into contact with a magnetic tape; and a protective film formed on a magnetic tape sliding surface of the head element portions and the sliding portions,
   wherein the protective film is formed in a portion other than a vicinity of both ends of the head rail in a traveling direction of the magnetic tape, and
   an outermost surface of the protective film, on which the magnetic tape is capable of sliding, is formed flat.

* * * * *